May 12, 1964     R. C. LARSON     3,132,804
THERMOSTATIC VALVE

Filed Dec. 18, 1961     2 Sheets-Sheet 1

INVENTOR
Richard C. Larson

BY Mason, Fenwick & Lawrence
ATTORNEYS

May 12, 1964
R. C. LARSON
3,132,804
THERMOSTATIC VALVE
Filed Dec. 18, 1961
2 Sheets-Sheet 2
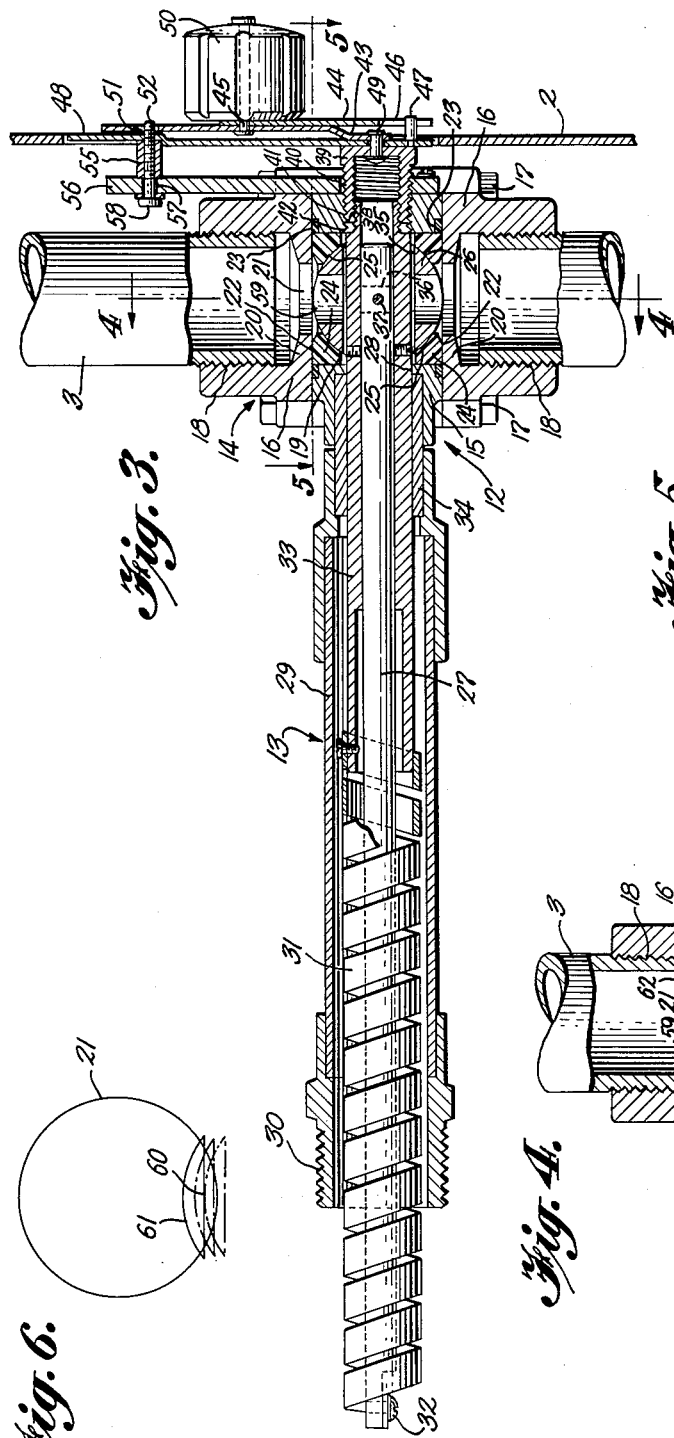
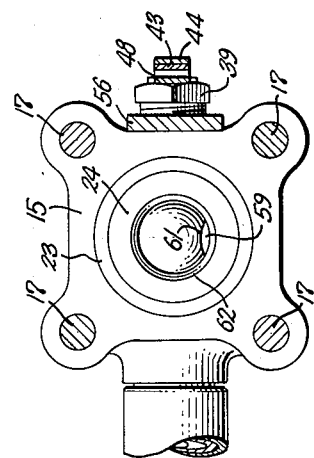
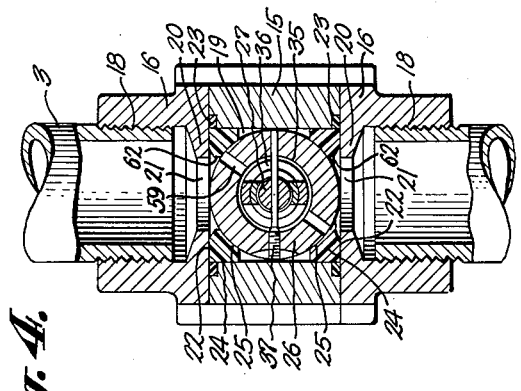
INVENTOR
*Richard C. Larson*
BY *Mason, Fenwick & Lawrence*
ATTORNEYS 000
United States Patent Office 3,132,804
Patented May 12, 1964

3,132,804
THERMOSTATIC VALVE
Richard C. Larson, 4420 Great Oak Road,
Rockville, Md.
Filed Dec. 18, 1961, Ser. No. 160,114
4 Claims. (Cl. 236—101)

This invention relates to control systems for hot water or steam heating plants and to automatic valves for use therein.

In most small building heating systems, such as used in homes, for example, the boiler heating unit is directly controlled from one, or more, room thermostats in direct accordance with conditions in the area containing the thermostat. Many times, this fails to provide satisfactory temperature throughout the building, due to extreme outside temperatures or differing conditions and requirements in different parts of the building. Some tests have been made, and some equipment is available for controlling the boiler by thermostatic means located inside and outside the building, so that normal boiler operation is modified in accordance with temperature conditions outside. This compensates for outside temperatures, but does not provide for automatic control of temperatures in all parts of the building being heated.

It is the general object of the present invention to provide a control system for heating plants wherein the boiler is controlled in accordance with outside temperature and air pressure, and the circulating water, or steam, as the case may be, is controlled automatically at each radiator in accordance with room requirements.

A more specific object is the provision of such a system wherein the boiler control is by means of an outside temperature and pressure responsive device, and the radiators are controlled by valves automatically operated in response to radiator fluid and room temperatures.

Another object is to provide a valve for radiators having improved temperature responsive control means.

A further object is the provision of an improved automatic valve having temperature responsive control means which is non-electric.

Still another object of the invention is to provide a non-electric control valve responsive to temperature changes, which can be pre-set to be responsive at selected temperatures to open and close, which setting can be quickly changed when desired.

It is also an object to provide a valve having improved orifice arrangement.

Other objects of the invention will become apparent from the following description of one practical embodiment thereof, when taken in conjunction with the drawings which accompany, and form part of, this specification.

In the drawings:

FIGURE 3 is a longitudinal section through the radiator control valve, and is taken on the line 3—3 of FIGURE 2;

FIGURE 4 is a vertical, transverse section through the valve taken on the line 4—4 of FIGURE 3;

FIGURE 5 is a horizontal section taken on the line 5—5 of FIGURE 3; and

FIGURE 6 is a diagrammatic view illustrating the relative positions of the valve orifice and the valve seat in several positions of the valve from fully open to fully closed.

In general, the invention contemplates the provision of outside air temperature and pressure responsive means to control the action of the boiler in a hot water, or steam, heating system, with independent valve control means at each radiator in the system, which valve control means is responsive to air and radiator temperatures. The valve is an improved valve of the rotary type and is controlled by thermally responsive mechanical means which can be pre-set to open and close the valve at predetermined temperatures. The action of the valve is not a step-by-step operation, or a simple open and close arrangement, but one wherein the valve opens and closes by continuous progression.

Figure 1:
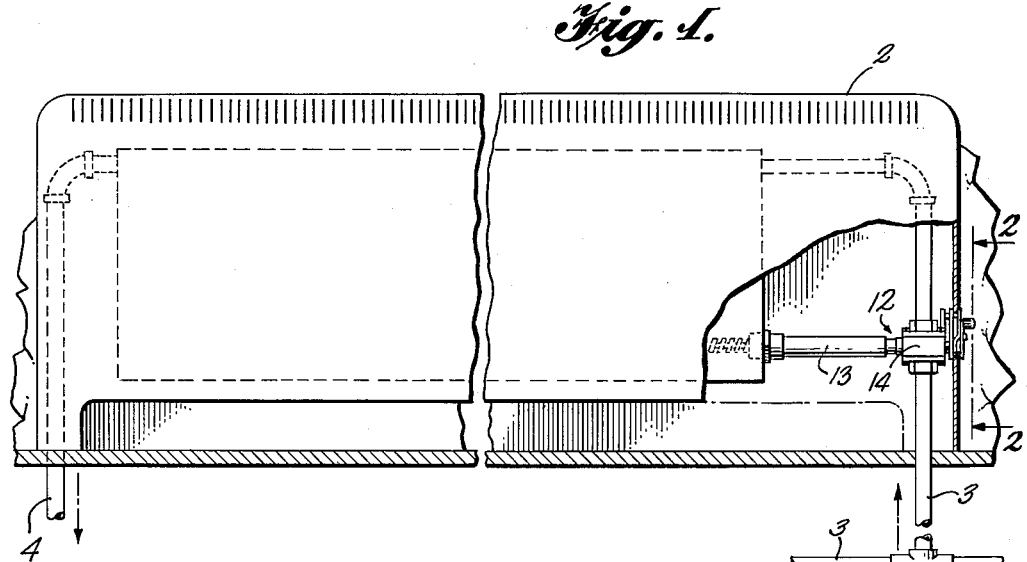
FIGURE 1 is a somewhat schematic view illustrating the control system of the present invention as applied to a hot water or steam heating system including a boiler and at least one radiator.
Figure 2:
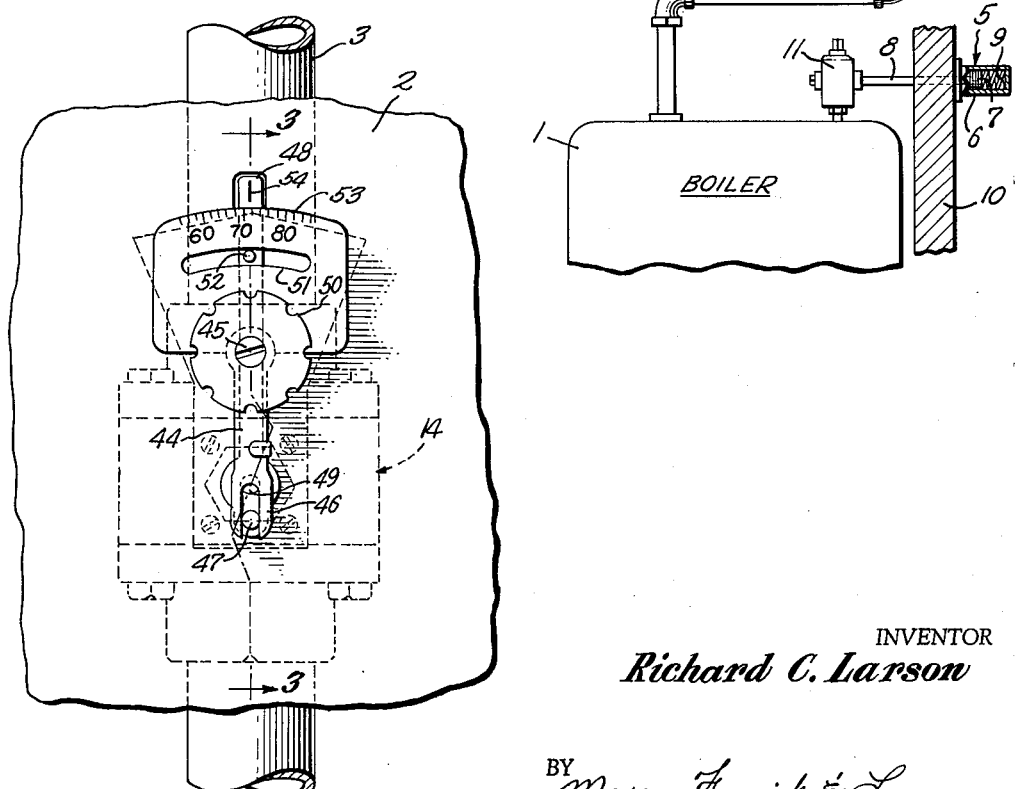
FIGURE 2 is an end elevation of part of a baseboard radiator, showing the control means for setting the radiator automatic valve.

Referring to the drawings in detail, and first adverting to FIGURE 1, there is shown a heating system which includes a boiler 1, which may be electrical, or gas or oil fired, one or more radiators 2 of standard type, and a piping system having pipes 3 leading from the boiler to the radiators, and the return lines 4. The system may operate with hot water or steam.

The boiler operation is controlled by means of a temperature responsive device 5, which may take the form of a casing 6 having a pile of bi-metal thermostatic disks 7 connected to a control rod 8 and loaded by a spring 9. This control is mounted outside the building wall 10 so that it is subjected to outside temperature only. The control rod 8 has its other end connected to an adjustment arm of a standard adjustable boiler pressure control element 11. Changes in outside temperature will cause the disks 7 of the pile to flex resulting in a push-pull operation of rod 8 and adjustment of the pressure control unit 11. Thus, the boiler operation will be a function of outside temperature and boiler pressure.

The baseboard radiator 2 shown is merely illustrative of any conventional type. Irrespective of the type of radiator used, it will be controlled by a valve 12 interposed in the line feeding the radiator. The valve will be automatically controlled, and will have its control body 13 inserted partially into the radiator and partially exposed to circulating room air. Thus, the valve will operate as required by changes in room air temperature, radiator temperature, or both.

With the system just described, the boiler will function to maintain boiler pressure at that degree predetermined for the particular outside temperature. Water, or steam, at desired pressure will be available at each radiator and will be admitted to the radiators in the system in accordance with the particular requirements of the areas which the respective radiators are to serve. Thus, outside temperature determines the potential of the heating fluid supply, and the room requirements determine the amount of the supply used in each room, or area.

The valves 12, which control the radiators are of special construction. Each includes a valve body 14 and a control body 13 which projects outwardly from the valve body.

The valve body 14 has a three-part housing comprising a hollow central member 15 and cap plates 16 on opposite ends of the central member. Bolts 17 hold the housing elements together. Each of the caps has a tubular, internally threaded fitting 18 to permit connecting the valve body in the heating system line, so that the heating fluid will flow through the housing when the valve is open. The central member has a cylindrical inner chamber 19 through its full height, and the caps have inwardly directed annular flanges 20 which overlie the peripheral portions of the chamber 19 in the central member. The openings 21 surrounded by the flanges 20 of the caps provide passages to and from the chamber 19 through the tubular fittings 18. The openings 21, the fittings 18 and the chamber 19 are in coaxial relation. The central member may be rabbeted around its opposite inner edges to provide ledges 22 to receive sealing gaskets 23 against which the cap members bear to prevent seepage of liquid between the central member and cap plates.

Valve seats 24 are fitted within the ends of the chamber 19 and rest against the overhanging flanges of the cap plates. It is contemplated that the valve seats will be self-lubricating plastic rings, of material such as Teflon. The inner edges of the rings are provided with inclined seating surfaces 25 of spherical curvature to seat a ball valve 26. The ball valve and its particular structure will be described later. The length of the cylindrical chamber in the central member is such that when the ball is in place, the valve seats in engagement with the ball, and the cap plates in position, the ball will be firmly held against the spherical seats, yet free to adjust itself to the seats.

The ball is mounted upon a stem 27, which is of considerable length and projects out through an opening 28 in the side of the central member 15, and extends co-axially through a tubular casing 29 which is carried by the central member and forms the housing for the control body 13 of the valve. The free end of casing 29 is open and threaded, as at 30, so that it can be screwed into a radiator.

Stem 27 extends beyond the open end of casing 29 to project into the water, or steam, space within the radiator. A helically wound, bi-metallic, thermostatic element 31 surrounds the outer end of the stem, and has one end attached to the stem end, as at 32. The other end of element 31 is connected to a tubular sleeve 33 which is rotatably mounted upon stem 27. The sleeve is mounted within a bushing 34 within casing 29. This mounts the sleeve for rotation within the casing and the stem for rotation within the sleeve.

Ball 26 has a diametrical bore 35 of sufficient diameter to permit the free passage of the sleeve 33, which extends completely through the ball and projects some distance forwardly of the ball. The sleeve is slotted on opposite sides, as at 36, in the region of the center of the ball, to provide free passage for a pin 37 which extends through the ball and the stem 27 to fix the ball to the stem. Slots 36 allow the stem to rotate and turn the ball independently of the sleeve. This mounting of the ball permits the ball some rocking movement about the pin 37 so as to seat properly on the seating surfaces 25 of the valve seats 24, and free rotation relative to the sleeve.

The forward end of sleeve 33 is threaded, at 38, and receives a cap 39. The cap is externally threaded, as at 40, and screws into a threaded bore 41 in the central member of the housing. As the cap is screwed up tight against a shoulder 42 in the sleeve, rotation of the cap on the threads of bore 41 will cause rotation of the sleeve. Cap 39 is fixed to an adjustment arm 43 which in turn is attached to an operating lever 44. The operating lever is connected to the arm 43 at a distance above the connection of arm 43 to cap 39 by means of a pivot 45. The lower end of lever 44 is forked, at 46, and straddles a pin 47 projecting from a range setting arm 48 which is pivotally carried on the connecting member 49 which fixedly joins the cap and adjustment arm. Pin 47 is on the opposite side of the connecting member 49 from the pivot 45. A knob 50 is carried by operating lever 44, and movement of the lever will cause the lever to rock on pin 47, thus bodily moving pivot 45 and causing the adjustment arm to swing and rotate the sleeve 33 about its axis. Adjustment arm 43 is slotted, as at 51, and a pin 52 carried by the range setting lever projects into the slot to limit the movement of the adjustment arm relative to the range setting arm. The adjustment arm is marked with a suitable temperature scale 53 for setting in conjunction with a datum mark 54 on the range setting arm. The pin 52 projects through arm 48 and is threaded into a sleeve 55 between the arm and a fixed plate 56 carried by the valve housing. Plate 56 has an arcuate slot 57 and the pin 52 passes through it. Pin 52 has a head 58 on the opposite side of plate 56 from sleeve 55. Thus, pin 52 can be moved along slot 57 and locked in desired position on the plate by tightening it in the sleeve 55. Movement of the pin in the slot will cause movement of the range setting arm relative to the plate. This, in turn, shifts the datum 54 and thereby changes the range of movement of the adjustment arm 43.

The ball 26 is apertured in a direction at right angles to the bore 35 to provide ports for the passage of fluid through the valve when the ball is rotated so that the ports are aligned with the openings 21 in the housing. These ports 59 extend from the bore 35 to the outer surface of the ball, and are of particular configuration. The ports are crescent-shaped in cross-section, having one side 60, which is a sector of a great circle of the sphere, and a side 61 which is an arc of a circle of shorter radius. The ports are oriented so that the side 61, which is a small circle curve, intersects the circle of the valve seat orifice 62 as the valve ball moves to open the passageway. Thus, an extremely small aperture may be provided at the outset of opening movement of the valve.

In mounting the valve, the threaded end 30 of casing 29 is screwed into the radiator so that the interior of the casing is in communication with the fluid in the radiator, but, more importantly, so that the exposed end of the helical bi-metallic thermostatic element 31 lies within the body of fluid in the radiator. The fluid pipe lines 3 are then connected to the threaded fittings 18 of the valve housing so that flow of fluid to the radiator is through the valve. After the valve is mounted, the range setting arm 48 is adjusted so that full range of movement of the adjusting arm 43 will be proper for the particular installation, and the headed pin 52 tightened to lock the range setting arm in position. It will be obvious that movement of the range setting arm to the right or left along the slot 57 in plate 56 will move the location of pin 47 and the datum mark. This will raise or lower the effective range of movement of the adjusting arm 43.

When the system is to be used, the adjusting arm 43 will be moved to the scale setting indicated for the desired room temperature. Such movement will cause rotation of the sleeve 33 and, through the sleeve, the helical thermostat, the stem and the ball valve. Thus, setting the arm will in turn set the position of the port 59 in relation to the valve seat opening.

Assuming that the system is in operation and the room temperature is at the desired level, the ball valve will be rotated so that the apertures 59 are not in registry with the valve orifices, and there will be no flow of fluid through the line 3 into the radiator. As the radiator and room temperautres fall, the bi-metallic element 31 will be affected both by direct contact with the radiator fluid and by flow of room air across the casing 29. This will cause winding movement of the helix. As one end of the helix is held by the sleeve 33, the winding movement will impart rotative movement to the stem 27 and rotative movement to the ball 26. The small circle curve side, 61, of the ball port will begin to move across the valve seat opening to allow fluid to flow through the valve into the radiator. The small circle curvature of the leading side of the valve port will open the valve by very small increments, thus permitting very close control of fluid flow through the valve. As temperature in the radiator and the room rises, the helix will react in reverse and the ball will rotate to shut off the fluid flow. At any time desired, the operating temperature can be changed by re-setting the adjustment arm to re-locate the valve port relative to the valve seat orifices.

With the system as described, a supply of heating fluid will be available at each radiator in accordance with the needs as dictated by outside temperatures. Each individual radiator will be controlled automatically in accordance with the needs of the area it serves to draw from the fluid supply. Any individual radiator may be re-set at any time as desired. The radiator valves, being actuated by radiator temperature as modified by room air temperature will react to maintain the room temperature at exactly the temperature desired.

While in the above one practical embodiment of the invention has been disclosed, it will be understood that the details of construction shown and described are merely by way of illustration, and the invention may take other forms within the scope of the appended claims.

What is claimed is:

1. A temperature responsive valve comprising, a housing having means at opposite ends for connection in a fluid line, a pair of spaced, opposed, annular valve seats within the housing, the annular seats defining passages through the housing communicating with said opposite ends of the housing, a ball valve having its opposite sides seated in sealing relation in the valve seats, the ball having a port diametrically therethrough for registry with the passages through the housing, the ball valve being apertured at right angles to the port, a stem extending through the aperture and connected to the ball by a pin extending through the stem and diametrically through the ball, a helical, bi-metallic thermostat surrounding the stem and having one end attached to the stem, a sleeve rotatable on the stem connected to the other end of the bi-metallic thermostat, the sleeve extending through the aperture in the ball and being slotted on opposite sides in the region of said pin to permit relative rotation between the stem and sleeve, and means to hold the sleeve in adjusted positions of rotation relative to the housing.

2. A temperature responsive valve as claimed in claim 1 wherein, the means to hold the sleeve in adjusted positions of rotation comprises an arm having a scale thereon carried by the sleeve, and a datum member held by the housing.

3. A temperature responsive valve comprising, a housing having means at opposite ends for connection in a fluid line, a pair of spaced, opposed, annular valve seats within the housing, the annular seats defining passages through the housing communicating with said opposite ends of the housing, a ball valve having its opposite sides seated in sealing relation in the valve seats, the ball having a port diametrically therethrough for registry with the passages through the housing, a stem projecting from the ball at right angles to the port, and a helical, bi-metallic thermostat surrounding the stem and having one end attached to the stem and the other end adjustably coupled to the housing, the port in the valve being crescent shaped in cross section with the crescent arranged normal to the path of travel of the port across the edge of the passageway through the housing.

4. A temperature responsive valve as claimed in claim 3 wherein the crescent-shaped port has a side which is an arc of a great circle of the ball and a side which is an arc of a small circle of the ball and the port is arranged so that the side of small circle curvature first intersects the housing passage edge when the ball is turned toward valve open position.

References Cited in the file of this patent

UNITED STATES PATENTS

| | | |
|---|---|---|
| 1,236,257 | Broomell | Aug. 7, 1917 |
| 1,621,640 | Mooney | Mar. 22, 1927 |
| 1,822,001 | Zisch | Sept. 8, 1931 |
| 1,948,659 | Giesler | Feb. 27, 1934 |
| 2,079,869 | Peo | May 11, 1937 |
| 2,434,086 | Taylor | Jan. 6, 1948 |
| 2,468,268 | Morton | Apr. 26, 1949 |
| 3,008,697 | Dermond | Nov. 14, 1961 |

FOREIGN PATENTS

| | | |
|---|---|---|
| 509,319 | Great Britain | July 13, 1939 |
| 618,751 | Canada | Apr. 18, 1961 |
| 738,582 | Great Britain | Oct. 19, 1955 |